United States Patent [19]

Fife et al.

[11] Patent Number: 5,558,762
[45] Date of Patent: Sep. 24, 1996

[54] PORTABLE WATER FILTER AND VALVE ASSEMBLY

[75] Inventors: James F. Fife; Daniel J. Vorhis; Kenneth D. Laughlen; Nancy L. Dienes, all of Seattle, Wash.

[73] Assignee: MSR, Seattle, Wash.

[21] Appl. No.: 249,903

[22] Filed: May 26, 1994

Related U.S. Application Data

[62] Division of Ser. No. 108,442, Aug. 18, 1993, Pat. No. 5,330,640, which is a division of Ser. No. 732,975, Jul. 19, 1991, Pat. No. 5,266,196.

[51] Int. Cl.⁶ ............................................. B01D 27/10
[52] U.S. Cl. ................ 210/130; 210/133; 210/134; 210/136; 210/416.3; 210/464; 137/149; 137/151
[58] Field of Search .................... 210/130, 133, 210/134, 136, 416.1, 416.3, 416.2, 464; 417/234, 572; 137/140, 147, 148, 149, 151

[56] References Cited

U.S. PATENT DOCUMENTS

| | | | |
|---|---|---|---|
| 1,566,426 | 10/1925 | Coop | 210/416.3 |
| 2,473,986 | 6/1949 | Booth | 210/416.3 |
| 2,955,712 | 10/1960 | Gutkowski. | |
| 3,460,805 | 8/1969 | Kudlaty. | |
| 3,628,662 | 12/1971 | Kudlaty. | |
| 4,142,973 | 3/1979 | Kachman. | |
| 4,276,163 | 6/1981 | Gordon. | |
| 4,316,801 | 2/1982 | Cooper. | |
| 4,534,713 | 8/1985 | Wanner | 210/416.3 |
| 4,556,484 | 12/1985 | Hunter et al. | 210/133 |
| 5,366,642 | 11/1994 | Platter et al. | 210/416.3 |

*Primary Examiner*—W. L. Walker
*Attorney, Agent, or Firm*—Seed and Berry LLP

[57] ABSTRACT

A water filter including an inlet assembly which comprises a prefiltering foam tip. The inlet hose includes an adjustable float and a weight on the end of the hose which allows a given length at the end of the inlet hose to extend below the surface of the water being filtered. The water filter further includes a check valve assembly to relieve pressure buildup inside the pump. A unique lever-action handle, in combination with a rocking piston, allows efficient filtering with few moving parts. The filter components are easily replaceable. The main filter assembly is suspended resiliently at its periphery to provide shock-absorbing characteristics. The filter also includes an adaptor base which allows for a direct connect between the vessel into which water is filter. The water filter also provides a unique method of storing the inlet hose to render the water filter easy to carry and prevent foreign objects and debris from entering into the area of working parts.

10 Claims, 7 Drawing Sheets

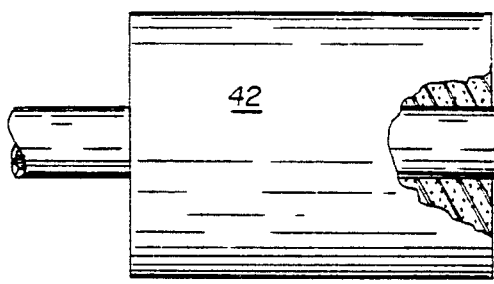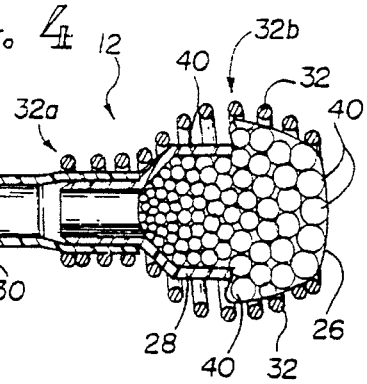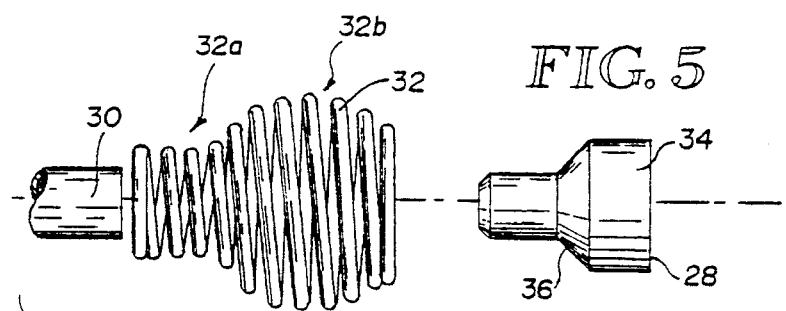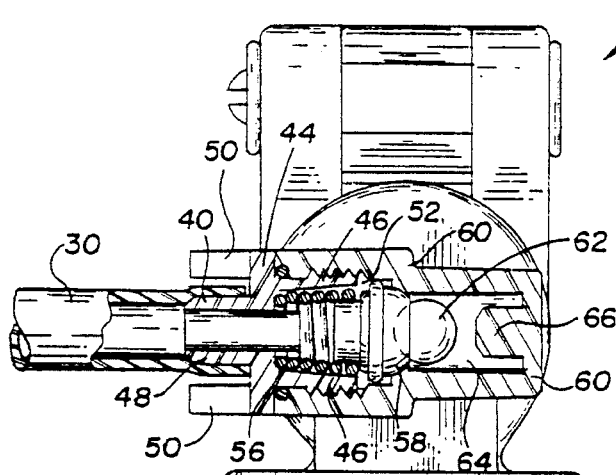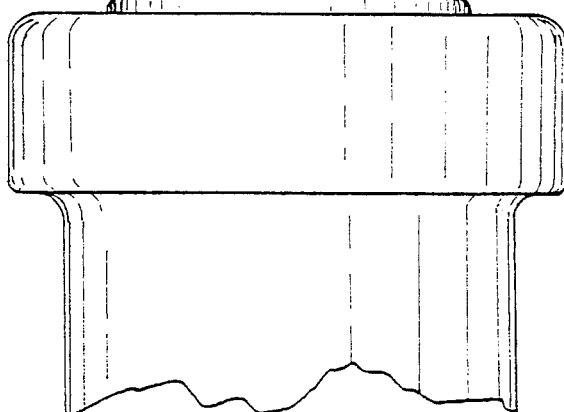

PORTABLE WATER FILTER AND VALVE ASSEMBLY

CROSS-REFERENCE TO RELATED APPLICATION

This application is a division of U.S. patent application Ser. No. 08/108,442, filed Aug. 18, 1993, and issued on Jul. 19, 1994, as U.S. Pat. No. 5,330,640, which was a division of U.S. patent application Ser. No. 07/732,975, filed Jul. 19, 1991, and issued on Nov. 30, 1993, as U.S. Pat. No. 5,266,196.

TECHNICAL FIELD

This patent relates to filters, and more particularly, to portable water filters.

BACKGROUND OF THE INVENTION

The need for filtering water for use, drinking, and consumption to remove impurities has long been recognized. The traditional method of purifying water is, of course, to pass the water through a water treatment facility. Such purified water is, however, often unavailable for persons engaged in international travel and for persons traveling through the back country. Although water may macroscopically appear clean and pure, it may nevertheless contain such impurities as bacteria, pesticides, Giardia and other Protozoa. For backpackers and persons traveling abroad, it is also desirable that the filter be small and easily portable, yet capable of separating such impurities from water drawn from a body of water, such as a lake or stream.

There are, however, several problems associated with traditional portable water filters. One problem relates to the intake of water into the water filter. There may be times when it is desirable to draw water from a body of water at a particular depth where the water is the purest. If, for example, a layer of scum lies on the top of a body of water, it may be desirable to place the opening of the intake hose several inches to several feet below the surface to filter the best quality of water available. This will lengthen the life of the filter and improve ultimately the quality of water obtained. Alternatively, if the most contaminated water resides close to the bottom of a body of water, it may be desirable to adjust the depth of the opening of the intake hose so that it is located close to the surface.

Another problem with respect to the intake of water into the water filter relates to dynamic bodies of water. In rivers and streams, the opening of an inlet hose on the filter may bob up and down in the water and remain, at least momentarily, above the surface of the water which prevents drawing a full stream of water into the intake hose.

Yet another problem associated with typical portable water filters is the large contaminants and objects that are suspended in the body of water from which water is being drawn. Absent a preliminary means for filtering the water before it enters into the intake hose, the valves and pumping mechanism can be damaged and the filter rendered useless in a relatively short period of time. Prescreening is thus desirable where relatively large foreign objects, such as twigs, leaves, heavy sediment or other large-sized objects, may be present in the water to be filtered.

Traditional prefiltering methods involve a variety of types of filters and screens. While these prefilters prevent large obstacles from entering into the intake hose, they are commonly permanently attached to the end of the intake hose and thus require backflushing to clean the prefilter and free it of objects that have become lodged in the filtering pores.

Still another problem associated with traditional portable water filters relates to clogging of the main filter medium within the filter body. Once the main filter medium has become clogged, which is inevitable over the long run, the filtering (usually carried out by some manner of pumping) becomes progressively more difficult. In most pump models, for example, the water discharged from the outlet remains the same for each full stroke of the piston being pumped. The more clogged the filter medium, the more difficult it is to pump. This increased difficulty of filtering water requires more effort for each pumping stroke, which also increases the strain on the parts and the operator. This pressure build-up within the filter also places additional stress on the mechanical parts, which can lead to failure of these parts.

Relief valves have heretofore been looked upon with disfavor in conjunction with small, portable water filters because of the added complexity to the water filter. A separate discharge tube is generally required to direct the pressurized water being relieved outside the filter.

Another problem associated with conventional portable water filters involves the mechanical means for forcing water through the filter. Prior filtering devices have included piston-cylinder arrangements where a rod is coupled to the piston so as to coincide with the orthogonal axis of the cylinder. The rod is typically secured in place relative to the cylinder by a wall with a central aperture through which the rod must pass. This keeps the plane of the piston perpendicular to the orthogonal axis of the cylinder at all times while the piston moves back and forth in the cylinder.

Prior filters with piston-cylinder arrangements are usually actuated by pumping the rod directly in and out of the cylinder as is done by a typical hand-held tire pump. This type of ergonomic pumping action is awkward and makes the overall process of filtering water complicated and difficult.

Lever-action pumps have traditionally not been used for portable water filters. Such lever-action pump handles require many linkage parts to ensure that as the piston is moved back and forth, it constantly remains in a plane perpendicular to the orthogonal axis of the cylinder. To achieve this constant perpendicularity with the lever-action handle, several linkage members are needed which increases the overall friction, number of parts that may fail or wear out, and the overall complexity of the filter device.

Still another problem associated with portable water filters relates to the filter medium on the inside of the water filter itself. Over time, the filter medium will become clogged with the filtered impurities. Therefore, it is inevitable that the filter of the medium must be changed or backflushed in some way. Removal and replacement of filter mediums on traditional portable water filters is generally complicated and expensive.

A further problem exists with respect to damage to the filter element from impact resulting from, for example, dropping the filter. Water filters have traditionally lacked the ability to absorb shock to prevent damage to the filter medium. Carbon, a filter medium commonly used in portable water filters, is particularly susceptible to breakage upon impact.

There are also problems associated with the build up of impurities inside the filter, which may later be discharged from the filter. For example, carbon filters are commonly used in portable water filters to filter bacteria and other microscopic impurities from the water. Once used, some water will remain inside the carbon filter medium. The water that remains in the carbon filter medium may act as a breeding ground for bacteria. When this occurs toward the downstream end of the carbon filter, the water initially discharged after a long period of non-use may be contaminated with living organisms.

Some other problems associated with portable water filters involve the vessel into which the filtered water is placed for use. Traditionally, portable water filters have been cumbersome and awkward in their pumping.

SUMMARY OF THE INVENTION

It is an object of the present invention to provide a portable water filter with an inlet hose that can be adjusted to draw water from a body of water at a variety of depth.

Another object of the invention is to provide a prefiltering device at the end of the inlet hose for preventing relative large-sized impurities from entering into the intake hose.

Still another object of the present invention is to provide a water filter with an inlet hose having an easily replaceable prefilter at the end of the inlet hose.

Yet another object of the invention is to provide a method of relieving pressure inside the water filter if the pressure exceeds a predetermined level.

Another object of the invention is to provide a means for redirecting unfiltered water back down through the inlet hose when the filter medium inside the main filter is clogged.

Still another object of the invention is to provide a water filter through which water can be pumped using the same amount of force regardless of the degree to which the filter medium has been clogged.

Still another object of the invention is to provide a water filter that includes a lever-action handle for pumping water through the filter that is efficient, reduces friction, requires few parts, is more ergonomic, and is less susceptible to breakdown.

Still another object of the present invention is to provide a cartridge filter assembly that absorbs shock and minimizes damage due to impact.

Still another object of the invention is to provide a cartridge filter assembly that is easily removable and economical to replace.

Another object of the invention is to provide a filter means for removing regrowth bacteria that form inside the filter medium before the water is completely discharged from the water filter.

Another object of the invention is to provide a water filter that requires only one person to operate.

Yet another object of the invention is to provide a water filter with a means for directly connecting the discharge end of the filter to a container into which filtered water is discharged.

Another object of the invention is to provide a water filter with a means for storing the inlet supply hose in a convenient manner on the water filter.

Another object of the invention is to provide a water filter with a means for sealing the inside of an open-ended piston-cylinder arrangement so that dirt or other foreign substances will be prevented from entering into the piston-cylinder arrangement.

The foregoing objects, and other objects that will become more apparent from the detailed description that follows, are achieved by providing a portable water filter having a float adjustably coupled to the end of the intake hose and a weight on the end of the intake hose so that the inlet opening can be placed at a given depth in the body of water from which water is being drawn. A prefilter assembly located at the end of the inlet hose prevents relatively large-sized impurities from entering into the inlet hose.

The water filter further comprises a combination check/relief valve which limits the flow of water in one direction during normal operation and discharges water back down the inlet hose if excessive pressure builds up within the filter assembly due to clogging. Water is forced through the water filter by way of a lever-action handle used in combination with a rocking piston to provide an easy-to-use, efficient method for filtering the water.

A unique cartridge filter assembly is provided inside the water filter which is supported at its periphery by opposite O-rings to cushion the filter medium and prevent damage in the event the water filter is subject to impact. The cartridge filter assembly is also easy to remove and inexpensive to replace. The water filter also includes a membrane filter located downstream of the cartridge filter assembly which acts as a final filtering medium to prevent residual regrowth bacteria from being discharged with the filtered water.

An additional feature of the water filter is an adapter base which allows for the filter to be directly connected to a vessel into which the filtered water can be discharged. The water filter further includes a feature for conveniently storing the inlet hose on the filter. A notch is provided on the lever-action handle so the hose can be placed in the notch to secure the handle tightly against the filter body which closes a door to prevent debris and other material from entering into the cylinder body of the piston-cylinder arrangement.

BRIEF DESCRIPTION OF THE DRAWINGS

FIG. 4 is a side elevational view, partly in section, of the hose and inlet assembly of the present invention.

FIG. 5 is an exploded view of the inlet assembly of the present invention.

FIG. 6 is a partial front elevational view, partly in section, of the check/relief valve of the present invention.

DETAILED DESCRIPTION OF THE INVENTION

Figure 1:
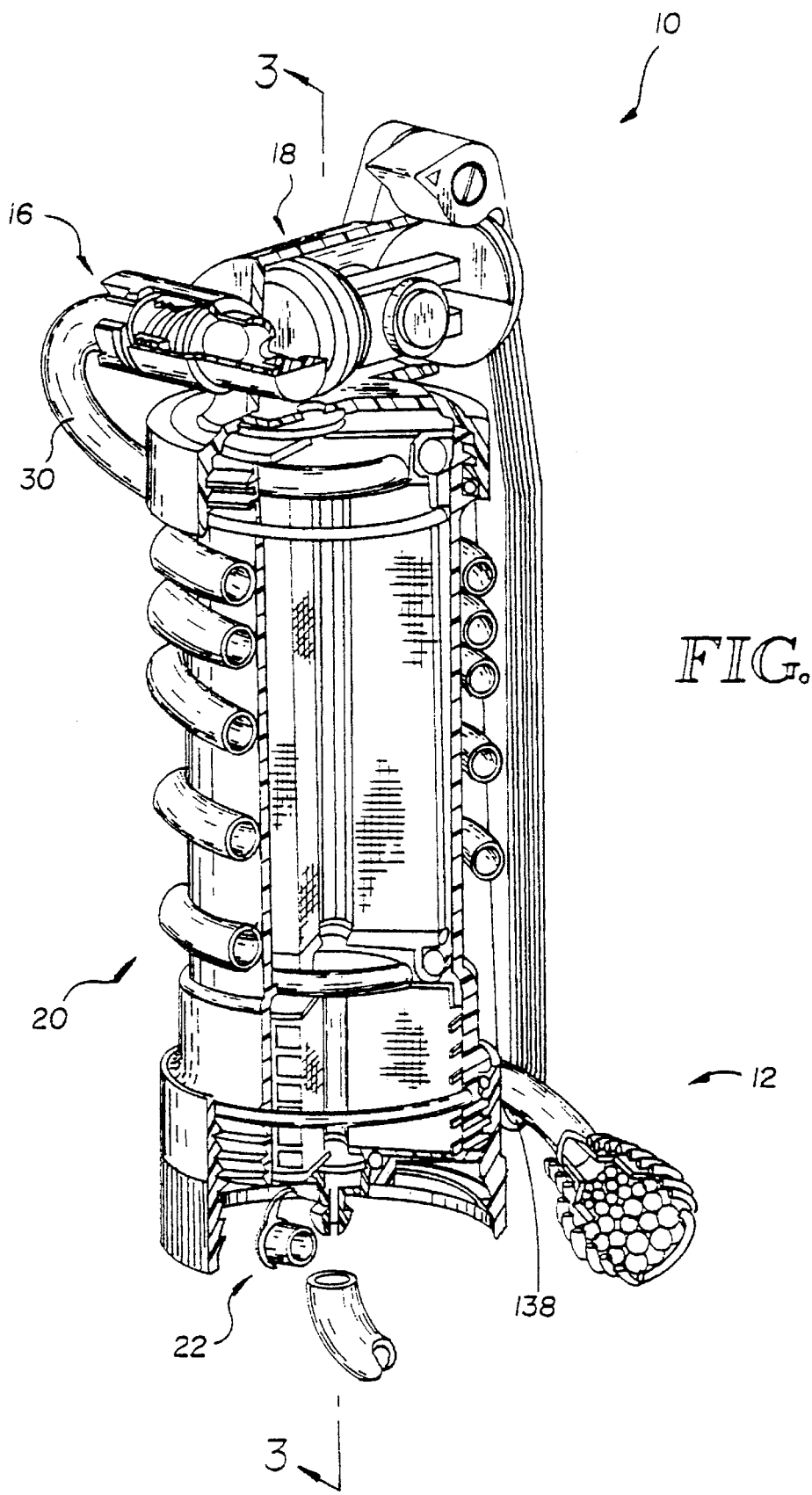
FIG. 1 is a perspective view, partly in section, of the water filter of the present invention.

With reference to FIG. 1, the present invention relates generally to a portable water filter 10 generally comprising an inlet assembly 12, a hose assembly 14, a relief valve assembly 16, a piston-cylinder assembly 18, a main filter assembly 20, a discharge assembly 22, and a handle assembly 24. The water filter is small and lightweight so that it can be used by persons traveling internationally or through the backcountry, such as backpackers, yet the water filter is highly effective for separating impurities from water commonly found in the backcountry, such as bacteria, pesticides, Giardia and other Protozoa.

Referring now to FIGS. 4 and 5, the water filter 10 comprises an inlet assembly 12, which includes a foam piece 26 partially inserted into an end housing 28, which is inserted, in turn, into a supply conduit or inlet hose 30. In one embodiment, the inlet hose is made of a flexible silicone material which is easy to bend to facilitate wrapping the hose around the filter when not in use. It is understood, however, that the hose could be made of any conventional material. A coil spring or cage 32 encapsulates the combination of the hose, the end housing, and the foam. The cage holds the inlet assembly together, and particularly, the foam piece inside the inlet housing. The cage further acts as a weight on the end of the hose. With reference to FIG. 5, the cage has a narrowed portion 32a which gradually increases to an enlarged portion 32b.

The end housing 28 comprises a cylindrical large diameter portion 34, frustoconical portion 36, and a cylindrical, small-diameter portion 38. The final element of the inlet assembly 12 is a compressible foam piece 26 having a plurality of pores 40. The pores are generally equal in size when the foam piece is in an uncompressed state.

In assembling the inlet assembly 12, the narrowed portion 32a of the cage 32 is slid over the end of inlet hose 30, after which the small diameter portion 38 of the end housing 28 is inserted into the hose. A portion of the foam 26 is then compressed (shown in phantom in FIG. 5) and forced into the large-diameter portion 34 and the frustoconical portion 36 of the housing, respectively. The cage is then slid back toward the end of the inlet hose so that the enlarged portion 32b encapsulates the foam and the end housing. The result is an inlet assembly that acts as a prefilter for preventing large-sized particles, such as leaves, twigs, large pieces of sediment, and the like, from entering into the inlet hose. This is first of four filtering stages that take place in the present invention.

Large particles are prevented from entering into the hose by means of the cage 32 and the exposed face of the foam 26 that extends beyond the cage. The compressed foam inside the end housing creates a reductive pore gradient (i.e., the pores become progressively smaller in a downstream direction), which allows the inlet assembly to filter progressively smaller-sized impurities as the water being filtered passes downstream. The foam piece can easily be removed and replaced relatively inexpensively. Alternatively the foam piece is easy to remove and clean by merely squeezing the foam piece on clean water. The inlet assembly provides an efficient, effective, prefiltering device for the water filter 10.

Figure 2:
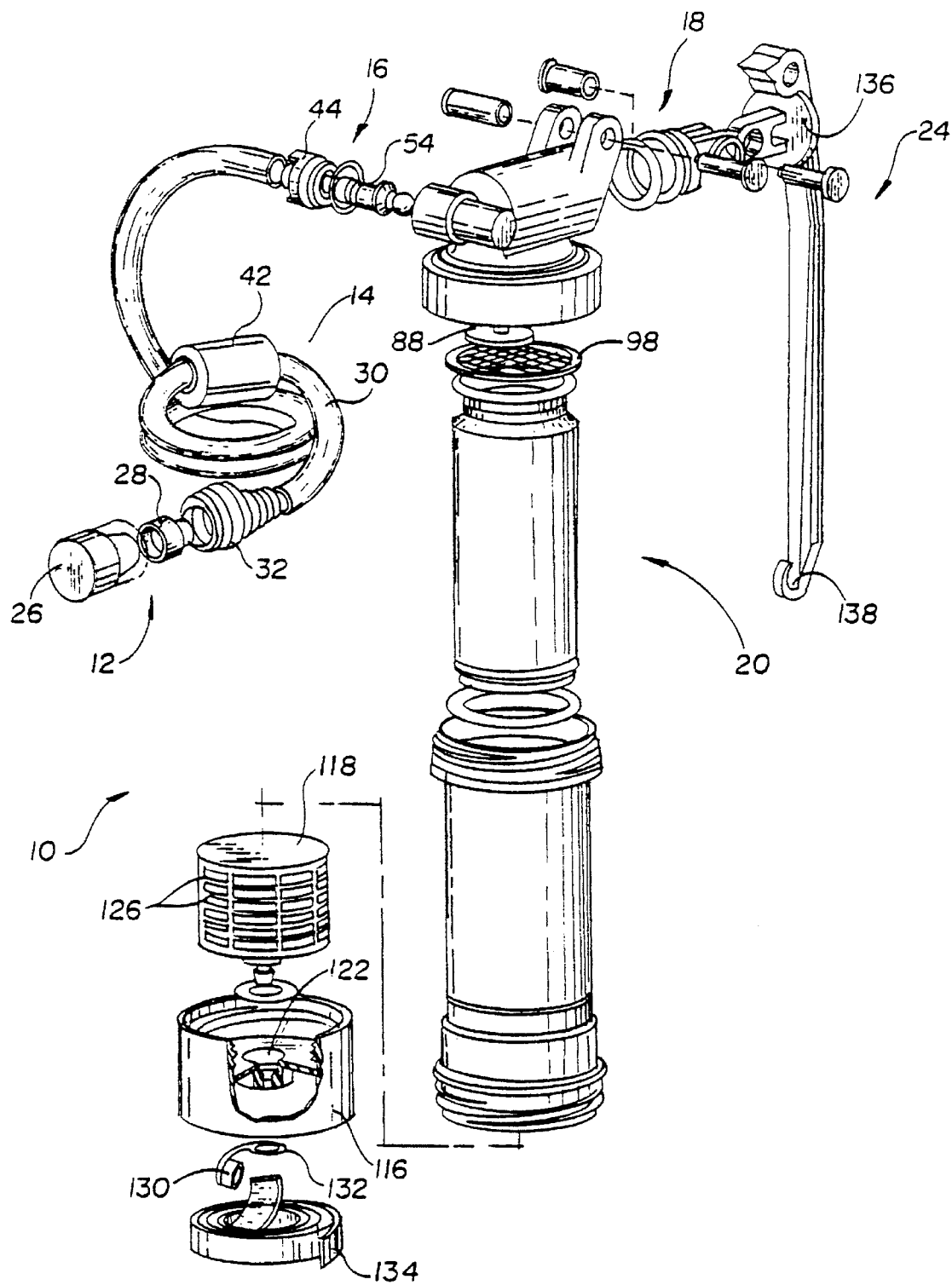
FIG. 2 is an exploded perspective view, partly in section, of the water filter of the present invention.

With reference to FIGS. 2 and 4, the hose assembly 14 generally comprises the inlet hose 30 and a float 42. The float is porous so that it floats to maintain a portion of the inlet hose above the surface of the water. The coil spring or cage 32 is preferably made of metal, which provides a weight for the end of the intake hose so that the intake end extends a given distance below the surface of the body of water from which water is being drawn. This is particularly advantageous when drawing water from rivers, streams and other moving bodies of water.

The float 42 is slidably positioned on the hose 30 so that the distance between the float and the end of the inlet hose can be varied. Therefore, the end of the hose can be positioned at a specific depth below the surface of the water to draw the highest quality of water available, thus avoiding unnecessary filtering. This can be advantageous if, for example, there is a layer of algae or debris on top of the water, in which case it would be desirable to draw water at a given depth below the surface. Alternatively, if the amount of suspended particulate matter in the body of water increases with depth, it would be desirable to draw water that is close to the surface. The float, therefore, can be adjusted and the hose simply placed in the body of water to draw water at a specific depth without the need of holding the end of the hose at that particular depth. This eliminates the need to use an extra hand (and thus an extra person) to hold the hose while filtering the water.

With reference to FIGS. 1, 2, 6, and 7, the water filter 10 further includes a combination check/relief valve assembly 16 which limits the flow of water to one direction (i.e., into the filter) during normal operation of the filter and relieves pressure that builds up inside the filter assembly beyond a predetermined level. Such pressure buildup is generally caused by clogging or some other type of obstruction inside the filter which prevents normal flow of water through the filter.

Figure 7:
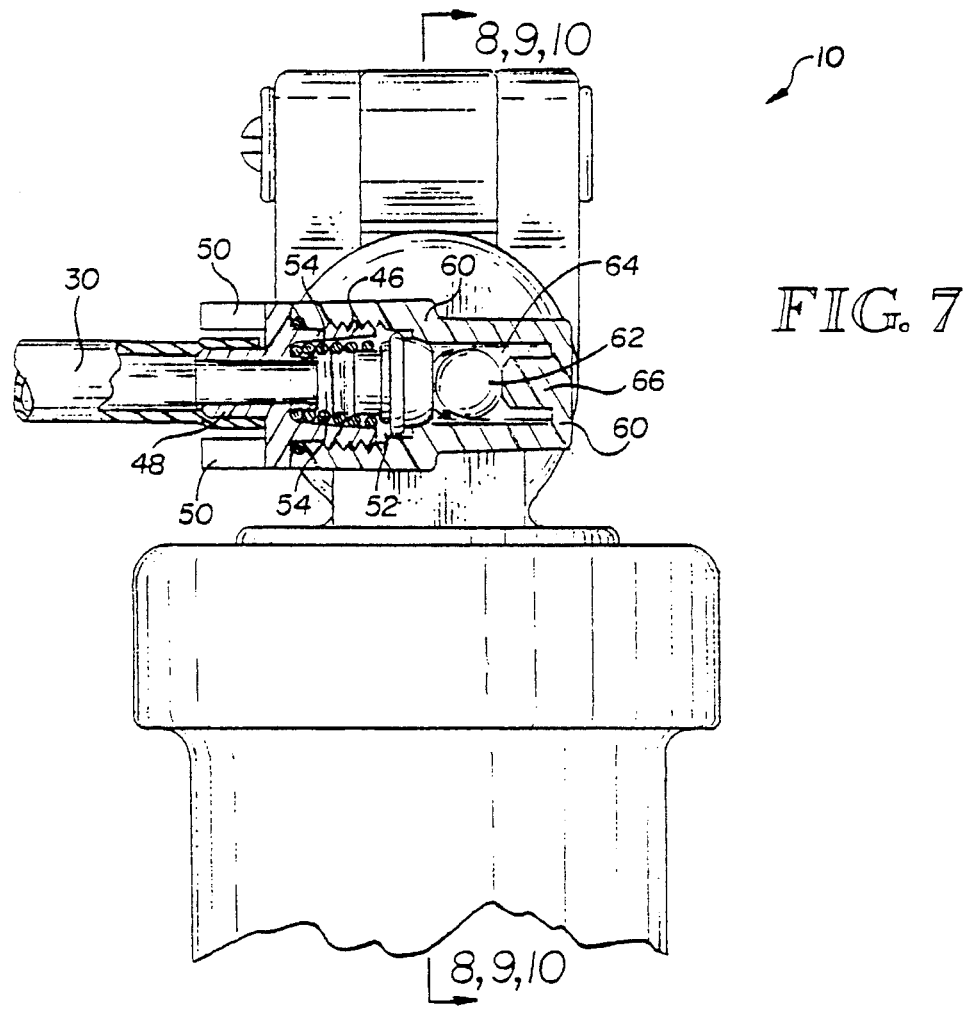
FIG. 7 is a front elevational view, partly in section, of the check/relief valve of the present invention.
Figure 7A:
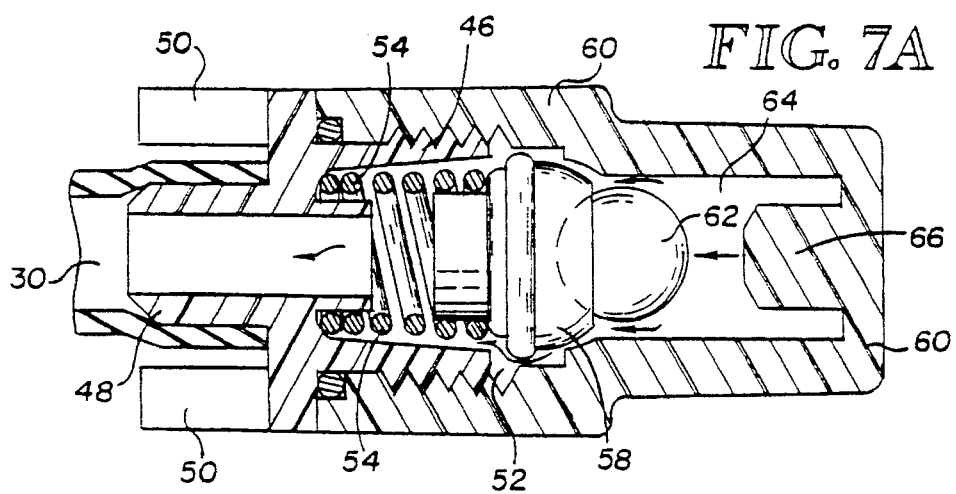
FIG. 7A is a magnified view of the check/relief valve, shown in FIG. 7, of the present invention.

As shown in FIG. 6, the check/relief valve assembly includes an inlet hose barb 44 which comprises a threaded portion 46, a first extension piece 48, and a pair of opposite flanges 50 which allow the inlet hose barb to be easily removed from the valve housing 60 of the water filter unit 10. As shown in FIGS. 7, 7A, the threaded portion defines a cavity 52 which houses a valve spring 54. The valve spring is inserted over a second extension piece 56 which holds the spring in place. An end of a poppet 58 is inserted into the valve spring 54. An outer surface of the poppet seats against the valve housing 60 during normal filtering, as shown in FIGS. 6 and 7.

The poppet also defines an inner seat engaged by a valve ball 62 during the filtering process.

The valve housing 60 defines generally a valve cavity 64 which extends beyond the normal position of the poppet 58. Water is drawn from the inlet hose 30 to force the ball 62 away from the poppet to allow water to enter into cavity 64. If water begins to escape back into the poppet and inlet hose, the ball seats against the poppet, thus functioning as a one-way check valve. The valve housing also comprises a stop 66 to limit movement of the valve ball 62 inside the valve cavity. If water pressure inside the filter exceeds a safe, predetermined level, the ball will seat against the poppet and the poppet is forced away from engagement with the valve housing to allow pressurized water to flow around the valve spring 54 and back into the inlet hose 30, as shown in FIG. 7A.

Figure 8:
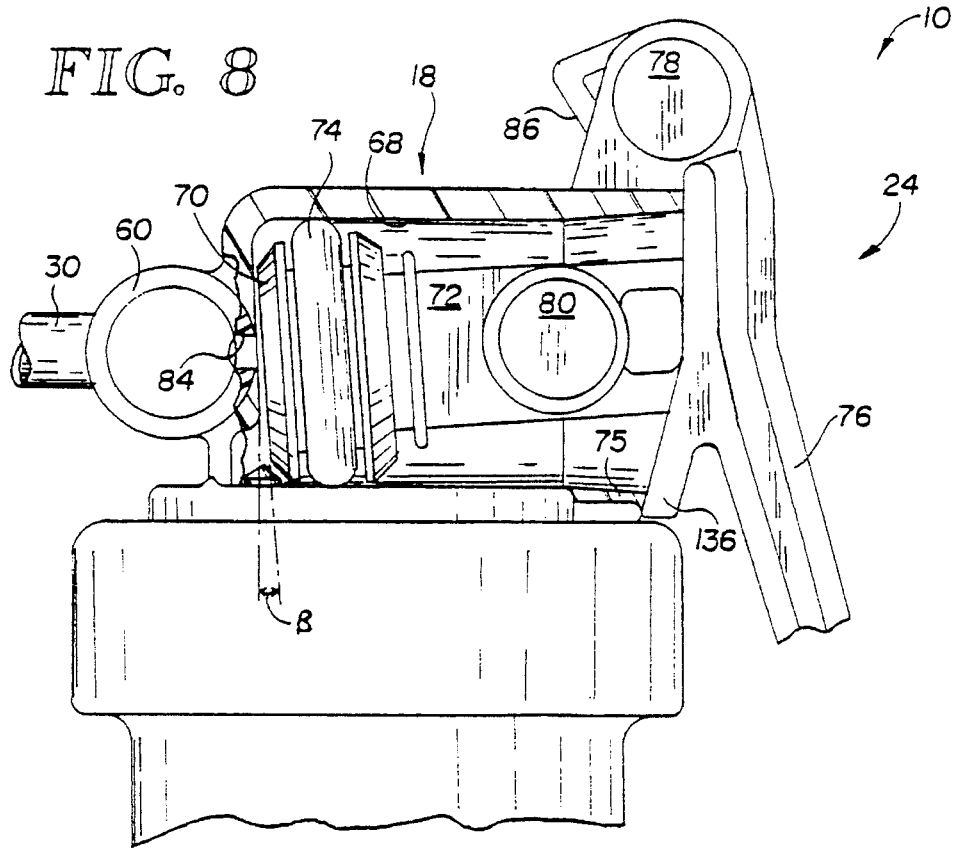
FIG. 8 is a partial side elevational view, partly in section, taken along the line of 8—8 of FIG. 7, the piston-cylinder arrangement of the present invention.
Figure 9:
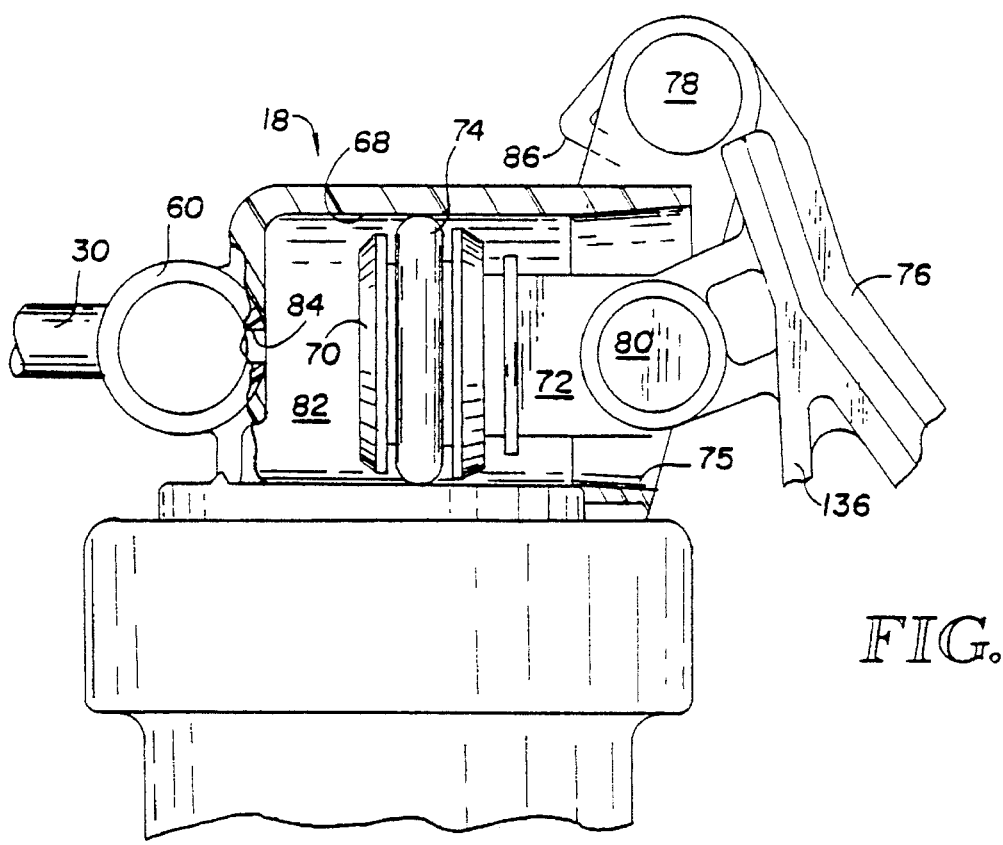
FIG. 9 is a partial side elevational view, partly in section, taken along the line of 9—9 of FIG. 7, of the piston-cylinder arrangement of the present invention.
Figure 10:
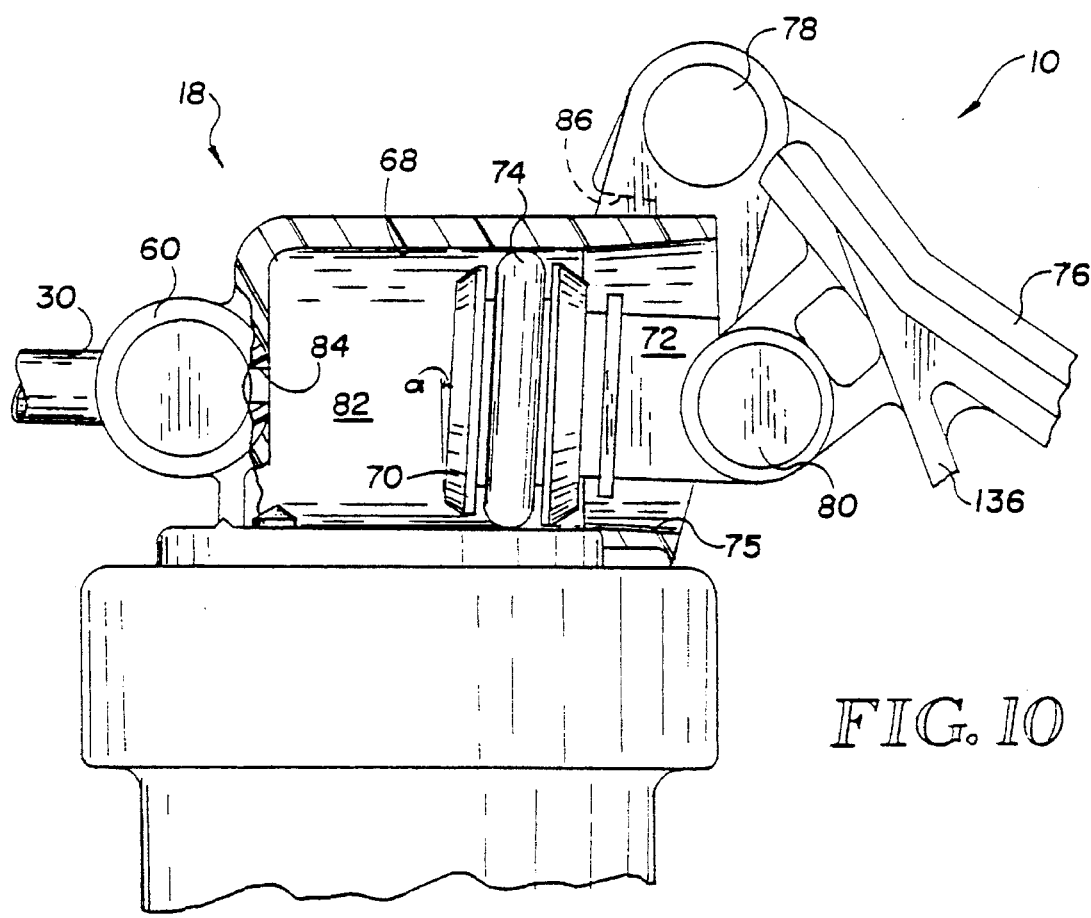
FIG. 10 is a partial side elevational view, partly in section, taken along the line of 10—10 of FIG. 7, of the piston-cylinder arrangement of the present invention.

Referring to FIGS. 8–10, the piston-cylinder assembly 18 comprises a cylinder 68 defined by a cylinder housing 69, a piston 70, and a rod 72. An end of the cylinder housing opposite the piston is open to allow for the free articulation of the rod. An oversized O-ring 74 is secured to the periphery of the piston to seal the space in between the piston and cylinder.

Actuation of the piston 70 relative to the cylinder 68 is caused by a lever-action handle 76 pivotally mounted to the water filter at pivot point 78 and pivotally mounted to the rod 72 at pivot point 80. In traditional piston-cylinder arrangements, the piston moves back and forth inside the cylinder so that the plane of the piston remains constantly perpendicular to the longitudinal axis of the cylinder. When using a lever-action handle to actuate the piston, however, multiple linkage members are required in order to maintain the piston constantly perpendicular with respect to the cylinder, along with an additional support toward the rear of the cylinder (typically a rear wall with an aperture) to maintain the rod in a centered position inside the cylinder.

In the present piston-cylinder assembly 18, the need for additional linkage members and additional structure in the cylinder have been eliminated by use of an open end 75 of the cylinder and a large size O-ring 74. The O-ring 74 allows the piston to effectively rock back and forth inside the cylinder without any leakage around the piston in between the periphery of the piston end wall of the cylinder. The rod is allowed to articulate freely because of the open end 75 of the cylinder.

As shown in FIG. 10, an expansion stroke of the piston 70 is caused by articulating the handle 76 away from the filter body 10 which increases the volume inside cylinder cavity 82. This increase in volume causes water to be drawn into the filter through the inlet hose 30, through the valve assembly 16 (FIGS. 6–7A), through the valve housing 60, and into cavity 82 via passageway 84 in the valve housing. The expansion stroke of the piston is limited by an abutment surface 86 of the handle 76.

An expansion stroke of the piston 70 is shown in FIG. 10. In this position, the top of the piston 70 is inclined with respect to the vertical to form an angle α. Normally, any "rocking" movement of the piston relative to a perpendicular plane as defined by the cylinder would cause leakage around the outside of the piston. The O-ring 74 is oversized, however, to accommodate the rocking motion of the piston and seal the area in between the periphery of the piston and inside of the cylinder 68.

FIG. 8 shows a compression stroke of the piston wherein the bottom of the piston face is angled relative to the vertical, which is represented by angle β. FIG. 9 shows the face of the piston 70 in a generally vertical orientation midway between the full compression and full expansion strokes.

Figure 3:
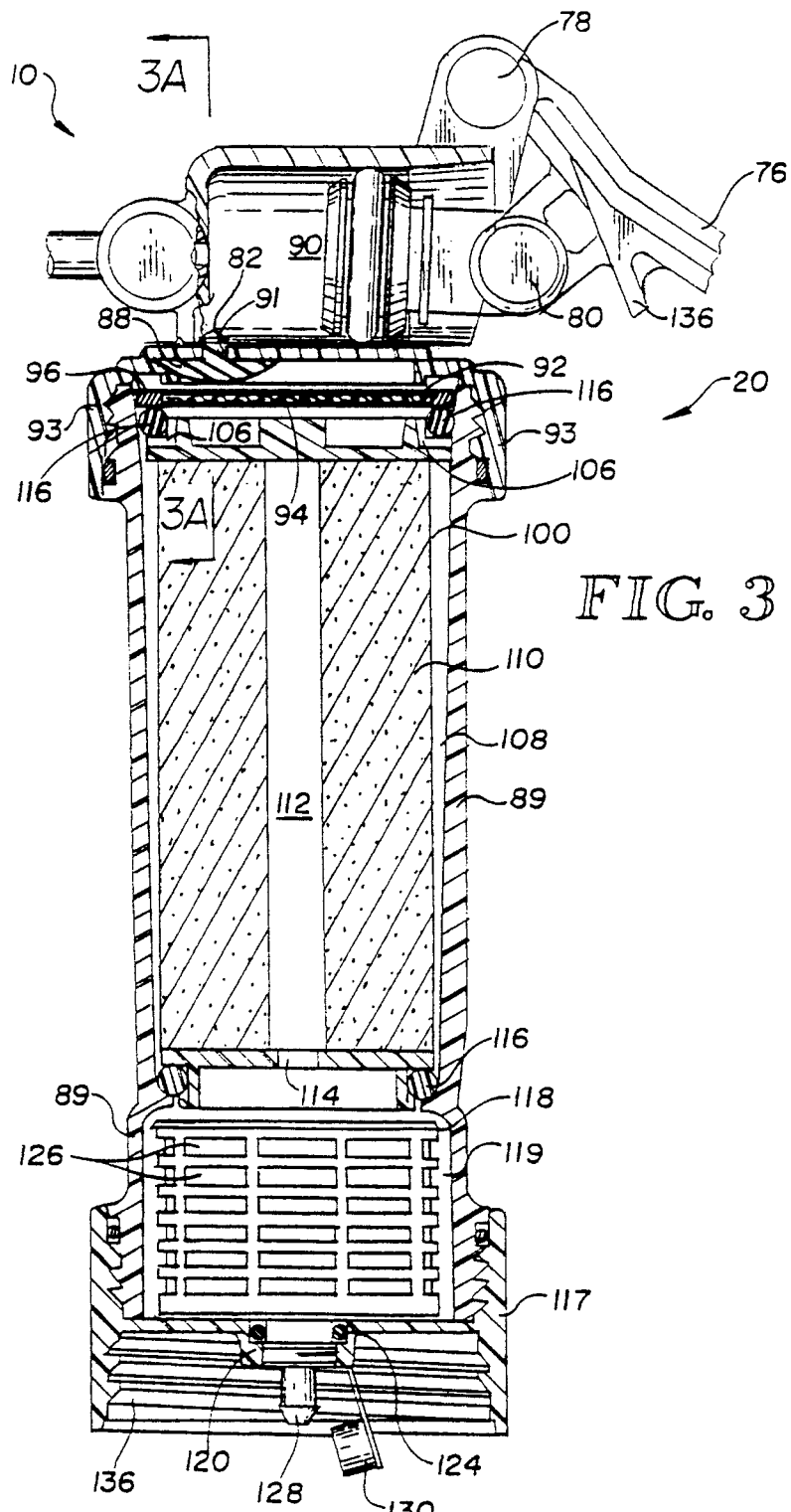
FIG. 3 is a partial sectional side view, taken along line 3—3 of FIG. 1, of the water filter of the present invention.
Figure 3A:
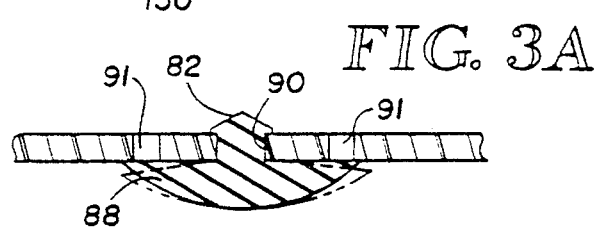
FIG. 3A is a cross-sectional view taken along line 3A—3A of FIG. 3 of the umbrella valve of the present invention.

Referring now to FIG. 3, once the water has entered into cavity 82 as a result of an expansion stroke of the piston 70, water will then be forced into the main filter assembly 20 by a compression stroke of the piston-cylinder assembly. The compression stroke causes the pressure inside of cavity 82 to increase, which forces open an umbrella valve 88 (FIG. 3A) coupled to the cap 93 through aperture 95 which allows water to enter a top cavity 90 through a pair of openings 91 in the cap 93 coupled to the main filter housing.

The water then proceeds down through a filter screen assembly 98, which generally includes at least one fine mesh screen 92 structurally supported by a coarse mesh screen 94. Other screen material may be nonwoven or sintered filtering media, for example. The filter screen assembly will, in one embodiment, separate 10 micron to 30 micron-sized particulate matter. The fine mesh screen, and possibly multiple fine mesh screens, along with the coarse screen are joined together at their peripheries by an annular ring 96 to form the complete filter screen assembly. The screen elements can be discs of woven or woven and bonded material. The filter screen assembly thus comprises the second stage of the overall filtering that takes place in the water filter 10.

In the alternative, if the downstream carbon depth medium, such as the carbon filter 110, is capable of multiple cleanings and of holding particulate matter on its surface, then a filter screen assembly may be eliminated.

Immediately below the filter screen assembly is a carbon filter or carbon depth media assembly having a top end cap 102 and a bottom end cap 104 to form a filter cartridge assembly 110. The top end cap defines a plurality of L-shaped slots 106 extend radially outwardly of the top end cap in all directions to provide multiple passageways for water to flow into a peripheral cavity 108 which surrounds the periphery of a carbon filter 110. Although carbon is used as a filter medium in one embodiment, it is understood that any suitable filter medium such as a diatomaceous earth or ceramics may be used. Water flows from the periphery of the carbon filter radially inwardly to a central cavity 112 defined by the carbon filter. The bottom end cap 104 defines a central aperture 114 through which water drains. The carbon filter is the third stage of filtering that occurs in the water filter 10, and is capable of separating 0.5 micron and larger-sized impurities. Specifically, the carbon filter is capable of removing chemical, microbiological, and particulate matter.

The carbon filter cartridge assembly 100 is supported by a pair of O-rings 116 placed around the top end cap 102 and bottom end cap 104, respectively. The O-rings 116 support the carbon filter assembly at its periphery by engaging the inside wall of the filter housing 89. The O-rings 116 are the only means for supporting the carbon filter assembly. In one embodiment, the O-rings 116 are made of a resilient material, such as rubber, to provide a means for absorbing shock to the water filter due to impact from dropping or the like, which prevents damage to the carbon filter assembly. This is particularly important since the water filter may be subject to abuse due to the backcountry environment in which the water filter 10 is intended to be used and because of the fragile nature of many filter mediums.

With reference to FIG. 3, a fourth and final filtering stage is provided at the bottom of the main filter housing 89. An adaptor base 117 is threadably connected to the main filter housing 89 to house a membrane filter cartridge 118. A threaded extension member 120 extending from the membrane filter cartridge is threadably secured to a threaded aperture 122 in the central portion of the adaptor base. An O-ring 124 seals the area in between the membrane filter cartridge and the adaptor base 117.

The membrane filter cartridge 118 houses a membrane filter 126 through which the water is forced before being discharged from the water filter 10. The membrane filter has the capability of separating impurities of 0.1 micron and larger. In general, use of a membrane to separate contaminants reduces the energy required to filter a given volume of water as compared to a depth filter medium.

After the membrane filter assembly 118 is threaded into the adaptor base 117, a barb 128 extends below the bottom surface of the adaptor base 117. A cap 130 includes a ring 132, which is inserted over the barb 128. The cap then remains constantly with the water filter 10 so that the barb can be covered to prevent contaminants from entering into the discharge passageway.

As shown in FIGS. 2 and 3, the adaptor base 17 can be directly connected to a vessel into which filtered water can be discharged. A vessel with a correspondingly threaded top can simply be threaded into threaded portion 136 of the adaptor base 117. This eliminates the need to use an extra person to hold the vessel, and eliminates the need to hold the filter directly over a vessel when filtering water. Alternatively, a discharge hose 134 can be inserted over the barb 128.

With regard to the operation of the piston-cylinder assembly 18, the present invention requires the cylinder 68 to have an open end 75 so there is no structural support of the rod 72 at the rear of the cylinder housing 69. This open end creates the possibility that dirt or other debris will enter into the cylinder and damage the sealing surface. However, the handle assembly 24 includes a door 136 which closes upon a full compression stroke of the piston 70 to prevent any debris from entering into the cylinder 68.

To facilitate storage of the hose 30 and to ensure that the door 136 of the handle assembly 24 remains closed when the pump is not being operated, the handle assembly 24 includes a notch 138 (FIGS. 1 and 2) into which a portion of the hose 30 can be inserted after the hose has been wrapped around the water filter 10. The size of the notch is slightly less than the size of the hose so that the hose must be forced into the notch, which holds the hose tightly in place. This ensures that the handle will remain close to the filter housing 89, and the door will remain closed when the filter is not being used to prevent dirt and debris from entering into the cylinder.

In operation, water is filtered through the water filter 10 by forcing the lever-action handle 76 away from the filter, which results in an expansion stroke of the piston 70, thus enlarging the volume of cylinder cavity 82 (FIG. 10). Water then enters into the inlet assembly 12 (FIG. 4) by passing through the foam 26, the end housing 28, and the inlet hose 30. The water then passes through the relief valve assembly 16 (FIG. 6) and forces the valve ball 62 away from the poppet 58 to enter into valve cavity 64. The water passes from the valve cavity 64 through passageway 84 and into the cylinder cavity 82 (FIG. 10). The lever-action handle is then forced toward the filter, which results in a compression stroke of the piston 70. This increases the fluid pressure in the cylinder cavity 82 which causes the water to flow through apertures 91 by forcing the umbrella valve 88 downward so water can pass into top cavity 90. The water then flows through the filter screen assembly 98, into the L-shaped grooves 106, and into the cavity 108 surrounding the carbon filter 110. The water next passes radially inwardly through the carbon filter and into the central cavity 112 through the central aperture 114 of the bottom end cap 104, and into the cavity 119 surrounding the membrane filter cartridge 118. Water then passes through the membrane filter 126 and is discharged through the opening in the barb 128.

If the filter becomes clogged, either partially or completely, the increased pressure due to the compression stroke of the piston 70 will cause the valve ball (FIG. 6) to become seated inside the poppet 58, which will normally prevent water from passing back down through the intake hose 30, and if the pressure reaches an excessive level, the poppet is pushed away from the valve housing 60 and water is forced around the outside of the poppet and back into the inlet hose 30 (FIG. 7A). This reduces the pressure on the lever-action handle 76 and allows the handle to be articulated with approximately the same amount of force as when there is no excessive pressure buildup. The amount of water passing through the filter will, of course, be reduced when the filter is clogged or partially clogged, but the force required to articulate the handle in a compression stroke will remain relatively constant.

While the preferred embodiments of the water filter have been described above and are shown in the drawings, it is understood that variations will be apparent to those skilled in the art. Accordingly, the present invention is not to be limited to the specific embodiments illustrated in the drawings and discussed above.

We claim:

1. A valve assembly in combination with a portable water filter, comprising:

a portable hand-held filter housing;

an inlet conduit for directing water into a water filter within said housing;

means for drawing water through the inlet conduit;

a check valve operatively connected to the inlet conduit for allowing flow of water only in a direction toward the water filter; and a relief valve for redirecting water if pressure within the filter increases beyond a predetermined level, the water being redirected back down the inlet conduit to confine the location of the redirected water to keep outer surfaces of the filter dry and free of contamination, the increased pressure resulting from the filter being clogged or from the flow of water through the filter being otherwise obstructed.

2. A valve assembly according to claim 1 wherein the check valve comprises a fluid stopper and a valve seat, wherein the fluid stopper is forced away from the seat when water is drawn into the filter through the seat, and wherein the stopper is forced into sealing engagement with the seat when water attempts to escape back through the seat into the inlet conduit.

3. A valve assembly according to claim 2 wherein the relief valve comprises a valve housing having a wall, a poppet which seats against the housing wall, and a valve spring coupled to the popper, wherein the popper is forced away from the housing wall when pressure inside the valve housing increases beyond a predetermined level.

4. A valve assembly, in combination with a portable water filter, comprising: a portable hand-held filter housing; an inlet conduit for directing water into a water filter within said housing; means for drawing water through the inlet conduit; a check valve operatively connected to the inlet conduit for allowing flow of water only in a direction toward the water filter; and a relief valve for redirecting water if pressure within the filter increases beyond a predetermined level, the water being redirected back down the inlet conduit to confine the location of the redirected water to keep outer surfaces of the filter dry and free of contamination, the increased pressure resulting from the filter being clogged or from the flow of water through the filter being otherwise obstructed, and wherein the check valve comprises a fluid stopper and a valve seat, wherein the fluid stopper is forced away from the seat when water is drawn into the filter through the seat, and wherein the stopper is forced into sealing engagement with the seat when water attempts to escape back through the seat into the inlet conduit, and wherein the relief valve comprises a valve housing having a wall, a popper which seats against the housing wall, and a valve spring coupled to the popper wherein the poppet is forced away from the housing wall when pressure inside the valve housing increases beyond a predetermined level, and wherein a single element comprises the valve seat for the check valve and the popper for the relief valve to form a combination valve seat/poppet such that when pressure increases beyond the predetermined level in the valve housing, the stopper engages the combination valve seat/popper and urges the combination valve seat/popper away from the housing wall to open a passageway back into the inlet conduit to relieve pressure in the water filter.

5. A valve assembly in combination with a portable water filter, comprising:

a portable hand-held filter housing;

an inlet conduit for directing water into a water filter within said housing;

means for drawing water through the inlet conduit;

a check valve comprising a fluid stopper and a valve seat operatively connected to the inlet conduit for allowing flow of water only in a direction toward the water filter; and a valve spring and poppet for redirecting water if pressure within the filter increases beyond a predetermined level, the valve seat and the poppet comprise a single element.

6. A valve assembly in combination with a portable water filter, comprising:

a portable hand-held filter housing;

an inlet conduit to direct water into a water filter within said housing;

a pump to draw water through the inlet conduit;

a check valve operatively connected to the inlet conduit to allow the flow of water only in a direction toward the water filter; and a relief valve to redirect water if pressure within the filter increases beyond a predetermined level, the water being redirected back down the inlet conduit to confine the location of the redirected water to keep outer surfaces of the filter dry and free of contamination, the increased pressure resulting from the filter being clogged or from the flow of water though the filter being otherwise obstructed.

7. A valve assembly according to claim 6 wherein the check valve comprises a fluid stopper and a valve seat, wherein the fluid stopper is forced away from the seat when water is drawn into the filter through the seat, and wherein the stopper is forced into sealing engagement with the seat when water attempts to escape back through the seat into the inlet conduit.

8. A valve assembly according to claim 7, wherein the relief valve comprises a valve housing having a wall, a poppet which seats against the housing wall, and a valve spring coupled to the poppet, wherein the popper is forced away from the housing wall when pressure inside the valve housing increases beyond the predetermined level.

9. A valve assembly, in combination with a portable water filter, comprising: a portable hand-held filter housing; an inlet conduit to direct water into a water filter within said housing; a pump to draw water through the inlet conduit; a check valve operatively connected to the inlet conduit to allow the flow of water only in a direction toward the water filter; and a relief valve to redirect water if pressure within the filter increases beyond a predetermined level, the water being redirected back down the inlet conduit to confine the location of the redirected water to keep outer surfaces of the filter dry and free of contamination, the increased pressure resulting from the filter being clogged or from the flow of water through the filter being otherwise obstructed, and wherein the check valve comprises a fluid stopper and a valve seat, wherein the fluid stopper is forced away from the seat when water is drawn into the filter through the seat, and wherein the stopper is forced into sealing engagement with the seat when water attempts to escape back through the seat into the inlet conduit, and wherein the relief valve comprises a valve housing having a wall, a popper which seats against the housing wall, and a valve spring coupled to the popper wherein the poppet is forced away from the housing wall when pressure inside the valve housing increases beyond a predetermined level, and wherein a single element comprises the valve seat for the check valve and the poppet for the relief valve to form a combination valve seat/popper such that when pressure increases beyond the predetermined level in the valve housing, the stopper engages the combination valve seat/popper and urges the combination valve seat/popper away from the housing wall to open a passageway back into the inlet conduit to relieve pressure in the water filter.

10. A valve assembly in combination with a portable water filter, comprising:

a portable hand-held filter housing;

an inlet conduit to direct water into a water filter within said housing;

a pump to draw water through the inlet conduit;

a check valve comprising a fluid stopper and a valve seat operatively connected to the inlet conduit to allow the flow of water only in a direction toward the water filter; and a valve spring and poppet to redirect water away from the water filter if pressure within the filter increases beyond a predetermined level, the valve seat and the poppet comprising a single element.

* * * * *